(12) United States Patent
Harris et al.

(10) Patent No.: US 9,663,843 B2
(45) Date of Patent: May 30, 2017

(54) MAGNET RECYCLING

(71) Applicant: The University of Birmingham, Birmingham (GB)

(72) Inventors: Ivor Rex Harris, Birmingham (GB); Allan Walton, Dudley (GB); John D. Speight, Framlingham (GB)

(73) Assignee: The University of Birmingham, Birmingham (GB)

( * ) Notice: Subject to any disclaimer, the term of this patent is extended or adjusted under 35 U.S.C. 154(b) by 615 days.

(21) Appl. No.: 13/907,166

(22) Filed: May 31, 2013

(65) Prior Publication Data

US 2013/0263699 A1    Oct. 10, 2013

Related U.S. Application Data

(63) Continuation-in-part of application No. 13/169,839, filed on Jun. 27, 2011, now Pat. No. 8,734,714.

(30) Foreign Application Priority Data

Dec. 2, 2010   (GB) .................................. 1020383.4

(51) Int. Cl.
*C22B 59/00*   (2006.01)
*H01F 1/055*   (2006.01)
(Continued)

(52) U.S. Cl.
CPC .............. *C22B 59/00* (2013.01); *B02C 23/08* (2013.01); *B22F 9/023* (2013.01); *B22F 9/16* (2013.01);
(Continued)

(58) Field of Classification Search
None
See application file for complete search history.

(56) References Cited

U.S. PATENT DOCUMENTS

| 4,820,481 A | 4/1989 | Wolff et al. |
| 4,893,756 A | 1/1990 | Fetcenko et al. |

(Continued)

FOREIGN PATENT DOCUMENTS

| CN | 1547514 | 11/2004 |
| CN | 2011800579080 | 11/2014 |

(Continued)

OTHER PUBLICATIONS

Search Report on EP Application 11813796.7, dated Dec. 15, 2015.*

(Continued)

*Primary Examiner* — George Wyszomierski
(74) *Attorney, Agent, or Firm* — Wells St. John P.S.

(57) ABSTRACT

The present invention discloses a method for recovering rare earth particulate material from an assembly comprising a rare earth magnet and comprises the steps of exposing the assembly to hydrogen gas to effect hydrogen decrepitation of the rare earth magnet to produce a rare earth particulate material, and separating the rare earth particulate material from the rest of the assembly.
The invention also resides in an apparatus for separating rare earth particulate material from an assembly comprising a rare earth magnet. The apparatus comprises a reaction vessel having an opening which can be closed to form a gas-tight seal, a separator for separating the rare earth particulate material from the assembly, and a collector for collecting the rare earth particulate material. The reaction vessel is connected to a vacuum pump and a gas control system, and the gas control system controls the supply of hydrogen gas to the reaction vessel.

7 Claims, 6 Drawing Sheets

(51) Int. Cl.

| | | |
|---|---|---|
| *H01F 1/057* | (2006.01) | |
| *B22F 9/16* | (2006.01) | |
| *B02C 23/08* | (2006.01) | |
| *B22F 9/02* | (2006.01) | |
| *C22B 7/00* | (2006.01) | |
| *C22C 1/04* | (2006.01) | |
| *B22F 9/00* | (2006.01) | |
| *H01F 41/02* | (2006.01) | |

(52) U.S. Cl.
CPC ............ *C22B 7/002* (2013.01); *C22C 1/0441* (2013.01); *H01F 1/0553* (2013.01); *H01F 1/0573* (2013.01); *B22F 2009/001* (2013.01); *B22F 2998/10* (2013.01); *B22F 2999/00* (2013.01); *H01F 41/0253* (2013.01); *Y02P 10/24* (2015.11)

(56) References Cited

U.S. PATENT DOCUMENTS

| | | | |
|---|---|---|---|
| 5,678,773 | A | 10/1997 | Takamura et al. |
| 5,849,109 | A | 12/1998 | Ikeda |
| 6,444,052 | B1 | 9/2002 | Honkura et al. |
| 6,533,837 | B1 | 3/2003 | Yamagata et al. |
| 6,797,081 | B2 * | 9/2004 | Hasegawa ............... B22D 13/02 148/101 |
| 7,448,500 | B2 | 11/2008 | Metcalfe et al. |
| 7,740,715 | B2 * | 6/2010 | Tomizawa ............ C22C 38/005 148/101 |
| 7,972,448 | B2 | 7/2011 | Reppel et al. |
| 8,734,714 | B2 | 5/2014 | Harris et al. |
| 9,336,932 | B1 * | 5/2016 | Zakotnik ................. C22C 28/00 |
| 2004/0251181 | A1 | 12/2004 | Metcalfe et al. |
| 2006/0162821 | A1 | 7/2006 | Reppel |
| 2012/0137829 | A1 | 6/2012 | Harris et al. |

FOREIGN PATENT DOCUMENTS

| | | |
|---|---|---|
| DE | 19843883 | 7/1999 |
| GB | 1020383.4 | 12/2010 |
| GB | 1020383.4 | 4/2011 |
| GB | 1020383.4 | 6/2011 |
| JP | 63-121808 | 5/1988 |
| JP | 62-264888 | 11/1988 |
| JP | 2 263902 | 10/1990 |
| JP | H 05-033073 | 2/1993 |
| JP | H 06-128610 | 5/1994 |
| JP | 10219311 | 8/1998 |
| JP | H 10-256014 | 9/1998 |
| JP | H 10-318672 | 12/1998 |
| JP | 2000-030919 | 1/2000 |
| JP | 2002-346532 | 12/2002 |
| JP | 2004-339542 | 12/2004 |
| JP | 2006/508241 | 3/2006 |
| WO | PCT/GB2011/001608 | 3/2012 |
| WO | PCT/GB2011/001680 | 3/2012 |
| WO | WO 2012/072989 | 6/2012 |

OTHER PUBLICATIONS

Office Action on JP Application 2013-541418, dated Jan. 5, 2016, with English translation.*
Ahmad, The Effect of Alloy Additions on the Magnetic Properties of RFeB Sintered Magnets:, Pakistan Engineering Conference, 69th Annual Session Proceedings (2004) pp. 365-370.
Zakotnik et al. "Hydrogen Decrepitation and Recycling of Sintered NdFeB-type Sintered Magnets", Proeedings of 19th International Workshop on Rare Earth Permanent Magnets & Their Applications, pp. 289-295.
Zakotnik et al., "Multiple Recycling of NdFeB-Type Sintered Magnets", Journal of Alloys and Compounds 469 (2009) pp. 314-321.
Zakotnik et al., "Possible Methods of Recycling NdFeB-Type Sintered Magnets Using the HD/Degassing Process", Journal of Alloys and Compounds 450 (2008) pp. 525-531.

* cited by examiner

US 9,663,843 B2

1
MAGNET RECYCLING

This application is a continuation-in-part of and claims priority to U.S. patent application Ser. No. 13/169,839, which was filed on Jun. 27, 2011, entitled "Magnet Recycling", which claims priority to UK Patent Application No. 1020383.4, which was filed on Dec. 2, 2010, entitled "Magnet Recycling", and this application is also a continuation of and claims priority to International Application Publication No. WO 2012/072989, which has an international filing date of Dec. 2, 2011, entitled "Magnet Recycling", the disclosures of which are incorporated herein by reference.

The present invention relates to a process and apparatus for recycling magnets. In particular, the invention relates to a process and apparatus for recovering rare earth magnets from assemblies.

Rare earth magnets, in particular permanent magnets of the NdFeB type (neodymium iron boron magnets) and SmCo (samarium cobalt), are known for their high magnetic flux combined with high coercivity compared with those of conventional magnets. SmCo magnets can have two different compositions, namely $SmCo_5$ and $Sm2(Co, Fe, Cu, Zr)_{17}$. The transition metal content of the latter composition is rich in cobalt but also contains other metals such as iron and copper, and is commonly referred to as $Sm_2Co_{17}$. Rare earth magnets have found application in a wide range of electronic goods and "green" technologies such as wind turbine generators and electric motors in electric and hybrid vehicles.

The supply of materials for rare earth magnets, particularly the supply of neodymium (Nd) and dysprosium (Dy), is limited and demand is expected to exceed supply. This has caused material prices to increase and this could limit the use of NdFeB magnets and the development of green technologies unless alternative magnets or sources of supply can be found. Dy is used as an additive to NdFeB for high coercivity magnets used in motor applications. The limited supply of Nd, samarium (Sm) and Dy is a major concern to many developed economies and some countries are now classifying these as strategic materials.

NdFeB magnets are the most common of the rare earth magnets and are manufactured in two forms; fully dense magnets produced by a sintering process and bonded magnets, a cheaper form with a lower performance where magnetic particles of NdFeB are bonded into a structure with resins.

Currently, approximately 12% of sintered NdFeB magnets are supplied for use in computer hard drives as small thin magnets, each of which is approximately 10-20 grams. It is desirable to recover and recycle the NdFeB magnets at the end of the life of the hard drives, particularly as computers have a rapid turnover (typically <5 years). However, the only current method of recovery is by disassembly and mechanical removal of the magnet, which is a time-consuming and labour-intensive process. Hence this labour-intensive mechanical recovery of NdFeB magnets is relatively expensive, particularly in western countries where there is a need to retain stocks of such magnets to reduce exposure to raw material supply constraints. There are several challenges in order to remove rare earth magnets from assemblies. For example, in hard disk drives the magnets are embedded in a complicated electronic device with a lot of fixings. The magnets may be Ni coated, they may be glued into the assemblies, and the magnets are permanently magnetic.

Another challenge for mixed waste streams is that some electrical goods may contain a mixture of different magnets including NdFeB, ferrite, AlNiCo and SmCo magnets. If magnetic identification is employed combined with mechanical separation, then a mixture of all of these magnets will result. If SmCo is mixed in with NdFeB then this is a particular concern as Sm contamination would have a very detrimental effect on the magnetic properties of any NdFeB magnets produced from the recycled powder.

There is thus a need for a cost-effective and efficient method of recovering rare earth particulate material from assemblies.

Recovery of bonded magnets by dissolution processes is known from U.S. Pat. No. 6,533,837, however, such processes cannot be employed for sintered NdFeB magnets.

Hydrogen Decrepitation (HD) is a known process for breaking rare earth alloys such as NdFeB into powder, as described by Zakotnik et al. ("Hydrogen Decrepitation and Recycling of Sintered NdFeB-type Sintered Magnets", Proceedings of $19^{th}$ International Workshop on Rare Earth Permanent Magnets & Their Applications; pp 289-295). In the decrepitation process hydrogen preferentially enters the rare earth rich grain boundaries in the material. Initially the hydrogen reacts with the rare earth elements at the grain boundaries to form a hydrogenated compound with the $H_2$ trapped in the crystal structure. The hydrogen then reacts with the NdFeB matrix grains forming an interstitial hydrogen solution with a ~5% volume expansion. The differential volume expansion of the crystal structure due to formation of the hydrogenated alloy causes the brittle structure to fracture so that grains break away from the material forming a fine powder.

According to a first aspect of the present invention there is provided a method for recovering rare earth particulate material from an assembly comprising a rare earth magnet, the method comprising the steps of:

exposing the assembly to hydrogen gas to effect hydrogen decrepitation of the rare earth magnet whereby a rare earth particulate material is produced, and separating the rare earth particulate material from the rest of the assembly.

The term "assembly" will be understood to mean any mechanical, electric or electronic device, machine or apparatus comprising multiple components, including, but not limited to, computer hard drives, speakers, dynamos, tools, motors, generators, MRI scanners, magnetic separators and the like.

It is known that rare earth magnets can be re-processed using the process of hydrogen decrepitation (HD), but the process has previously only been applied to "clean" uncoated magnets and not to assemblies where the main proportion of the content is other materials, which makes the magnets difficult to access. Thus the method of the invention allows rare earth particulate material to be recovered from an assembly without the need to first disassemble the components of the assembly, thereby saving time, labour, money and energy. Conveniently, multiple assemblies may be processed at the same time to extract the rare earth particulate material.

In an embodiment, the rare earth magnet is NdFeB or SmCo.

In an embodiment, the rare earth magnet is NdFeB. The NdFeB magnet is demagnetised during the decrepitation process, thereby allowing the rare earth particulate material to be easily separated from the other components of the assembly. In an alternative embodiment, the rare earth magnet is SmCo. The SmCo magnet may be $SmCo_5$ or $Sm_2Co_{17}$. In a particular embodiment, the rare earth magnet is $Sm_2Co_{17}$. SmCo magnets are not demagnetised by the decrepitation process. The magnet may be demagnetised by other methods, for example by heating or by reversing the magnetic field.

In an embodiment, the method comprises an initial step of opening the assembly prior to exposing the assembly to the hydrogen gas, in order to facilitate exposure of the rare earth magnet to the hydrogen and to allow an exit route for the rare earth particulate material. Opening of the assembly may involve destructively processing the assembly. For example, the assembly may be destructively processed by a mechanical process such as shredding or crushing, or by cutting open the assembly, e.g. using a cropper. Destructive processing may be particularly important for assemblies which are relatively gas tight, such as computer hard drives. Shredding may be particularly important for electronic devices (e.g. mobile phones) in which the magnets are only present in small quantities and/or which have multiple layers, making it difficult to extract the rare earth particulate material. By cutting the assembly open it is possible to keep the magnets intact in the device before the hydrogen decrepitation process is applied. This method of destructive processing therefore reduced the levels of impurities from other materials, compared to those introduced by shredding.

Alternatively, the assembly may be left complete and intact prior to its exposure to the hydrogen gas.

The assembly may be exposed to pure hydrogen gas, or it may be exposed to a mixture of hydrogen with one or more inert gases, for example nitrogen or argon. By "inert" it will be understood that the gas is non-reactive with the rare earth magnets under the conditions of use. In an embodiment, the assembly is exposed to an atmosphere comprising no more than 10% hydrogen, no more than 5% hydrogen or no more than 3% hydrogen, no more than 1% hydrogen, no more than 0.5% hydrogen or no more than 0.1% hydrogen. The use of a non-explosive gas mixture simplifies the processing equipment and makes handling of the gas safer.

A further advantage of using an inert atmosphere is that it protects the magnet material from oxidation. This is particularly advantageous where shredding is used, because as the rare earth magnets are broken up a large surface area is created which will oxidise if the shredding is carried out in air. Surface oxidation can prevent hydrogen from getting into the structure of the magnet pieces, slowing down or even preventing decrepitation. Therefore, in an embodiment, the destructive processing or shredding of the assembly is carried out in the absence of oxygen. The destructive processing/shredding may be carried out in an inert atmosphere of argon or nitrogen.

In a further embodiment, the assembly is destructively processed or shredded at the same time as being exposed to hydrogen gas. Shredding/destructive processing and decrepitation may be carried out simultaneously in an atmosphere consisting of pure hydrogen, or an atmosphere comprising no more than 10%, no more than 5%, no more than 3% hydrogen, no more than 1% hydrogen, no more than 0.5% hydrogen or no more than 0.1% hydrogen in nitrogen or argon. Simultaneous shredding and decrepitation enables rare earth particulate material to be recovered more efficiently from assemblies.

The high surface area of the rare earth magnet pieces produced by the shredding also allows the rare earth material to absorb the hydrogen very quickly, so that decrepitation can be carried out at relatively low partial pressures of hydrogen. This can be achieved by using a $H_2/N_2$ or a $H_2/Ar$ mixture.

The pressure (or partial pressure where a mixture of gases is used) of hydrogen must be sufficient to break up the magnet structure and turn it into a particulate material. Where a low partial pressure of hydrogen is used (for example for shredded material), the gas mixture may be non explosive. This has a significant advantage as the gas can be used with less stringent health and safety regulations. However, if the pressure (or partial pressure) of hydrogen is too low the reaction kinetics will be too slow for the process to be commercially viable. If the pressure is too high the reaction vessel will have to be engineered to withstand the higher mechanical stresses, which will increase the complexity and cost and result in smaller reaction chambers. In a series of embodiments the pressure, or partial pressure where a mixture of gases is used, of hydrogen is from 1 mbar to 100 bar, from 0.1 bar to 70 bar, from 0.1 bar to 50 bar, from 0.5 bar to 20 bar, or from 1 bar to 10 bar.

The atmosphere may be static or it may be flowing. If a static atmosphere is used, the level of hydrogen gas may need to be topped-up to maintain the pressure required and replace the gas which is consumed by the decrepitation process.

In an embodiment, the decrepitation process (i.e. the exposure of the assembly to the hydrogen gas) is carried out at a temperature of no more than 600° C., no more than 400° C., no more than 200° C. or no more than 170° C. In an embodiment, decrepitation is carried out at a temperature of no less than 5° C., no less than 10° C., no less than 15° C. or no less than 20° C. If the temperature is too high, formation of the hydrogenated alloy will not occur so the magnet(s) will not turn into a particulate material. It is also possible that at high temperatures other parts of the assembly could melt and hinder the recovery of the particulate magnet material. This may also result in impurities being entrained in the separated rare earth materials.

Higher pressures and temperatures are required for the decrepitation of $Sm_2Co_{17}$ magnets compared to NdFeB or $SmCo_5$ magnets. Thus, in an embodiment wherein the rare earth magnet is $Sm_2Co_{17}$, the decrepitation process is carried out at a relatively high temperature and/or a relatively high pressure. Suitably high temperatures include temperatures of at least 70° C., at least 80° C., at least 90° C. or at least 100° C. Suitably high pressures include pressures of at least 7 bar, at least 8 bar, at least 9 bar and at least 10 bar. Conversely, if it is desired to cause decrepitation of a NdFeB and/or $SmCo_5$ magnet but not a $Sm_2Co_{17}$ magnet, the decrepitation process may be carried out at a relatively low temperature and a relatively low pressure. For example, decrepitation of a NdFeB and/or a $SmCo_5$ magnet may be carried out at 2 bar and room temperature. Under these conditions decrepitation of a $Sm_2Co_{17}$ magnet will not occur. The different conditions required for the decrepitation of NdFeB or $SmCo_5$ magnets compared to $Sm_2Co_{17}$ magnets conveniently allows the selective separation of NdFeB or $SmCo_5$ magnets from $Sm_2Co_{17}$ magnets. This is advantageous because even small quantities of samarium alloy in NdFeB material can be highly detrimental to the performance of an NdFeB magnet. Currently, these magnets must be analysed chemically to determine their composition, followed by mechanical separation. Furthermore, ferrite magnets and AlNiCo magnets do not undergo decrepitation when exposed to hydrogen. The present invention therefore allows the separation of these magnets from rare earth magnets using the HD process.

Therefore, in a particular embodiment, the method is for recovering NdFeB or $SmCo_5$ particulate material from an assembly comprising an NdFeB and/or a $SmCo_5$ magnet in addition to a $Sm_2Co_{17}$ magnet, the method comprising the steps of:

exposing the assembly to hydrogen gas at a temperature and pressure that is sufficient to effect hydrogen decrepitation of the NdFeB and/or the SmCo$_5$ magnet only but is insufficient to effect hydrogen decrepitation of the Sm$_2$Co$_{17}$ magnet, whereby NdFeB and/or SmCo$_5$ particulate material is produced, and separating the NdFeB and/or SmCo$_5$ particulate material from the rest of the assembly.

SmCo$_5$ particulate material retains its permanent magnetism and so it can be easily separated from non-magnetic NdFeB material following the decrepitation process. Thus, in an embodiment wherein the assembly comprises a NdFeB magnet and a SmCo$_5$ magnet, and the decrepitation process results in the production of a mixture of NdFeB particulate material and SmCo$_5$ particulate material, the method may comprise the additional step of separating the non-magnetic NdFeB particulate material from the magnetic SmCo$_5$ particulate material. In some embodiments, the SmCo$_5$ particulate material is magnetically attached to ferrous components of the assembly, facilitating its separation from the non-magnetic NdFeB particulate material.

The assembly is exposed to the hydrogen gas for a period of time which depends on a number of factors including the hydrogen gas pressure, the temperature of the decrepitation process, the surface condition of the magnet(s) and the size of the magnet(s). In a series of embodiments, the assembly is exposed to the hydrogen gas for a period of time of from 10 minutes to 2 weeks, from 30 minutes to 1 week, from 1 hour to 64 hours, from 2 to 52 hours or from 3 to 48 hours. In another series of embodiments, the assembly is exposed to hydrogen for a period of time of from 2 to 8 hours, from 3 to 6 hours or from 4 to 5 hours.

The rare earth particulate material resulting from the decrepitation process (also referred to as the 'particulate material' or 'particles') may have a particle size that is smaller than most or all of the other components in the waste assembly, facilitating separation from the remaining assembly components. Separation of the rare earth particulate material may be carried out by any suitable method, including mechanical agitation such as shaking, vibration, sieving or tumbling, or using centrifugal forces. Separation of the particulate material may be carried out during and/or after the decrepitation process. The separated particulate material may contain impurities, for example resulting from a shredding process. The method may therefore include a further step of chemically treating the recovered particulate material to remove or reduce the level of impurities.

The rare earth particulate material which results from the decrepitation process comprises a hydrogenated alloy of the rare earth element. In an embodiment, the method of the invention comprises an additional step of degassing to break down the hydrogenated alloy to remove the H$_2$ from the particulate material. In an embodiment, degassing is carried out by heating the particulate material. In a series of embodiments, degassing is carried out at a temperature of no more than 1500° C., no more than 1000° C. or no more than 800° C. In another series of embodiments, degassing is carried out at a temperature of no less than 400° C., no less than 500° C., no less than 600° C. or no less than 700° C. In a particular embodiment, degassing is carried out at a temperature of 750° C. In another series of embodiments, degassing is carried out at a pressure of no more than 1 Bar, no more than 0.5 Bar, no more than 0.1 Bar, no more than 0.05 Bar or no more than 0.01 Bar. Degassing may be carried out immediately after formation of the particulate material by the decrepitation process, or it may be carried out at a later time or date.

The rare earth particulate material may have a particle size ranging from about 1 µm to about 1 cm in size.

One of the problems in recycling rare earth magnets is the removal of coatings from the surface of the magnets, such as Ni, Al, Zn and Au coatings. The most commonly used coating is electrodeposited Ni. It is possible to process coated rare earth magnets using hydrogen decrepitation. However, higher pressures and temperatures are required for undamaged coated rare earth magnets compared to uncoated magnets. Thus, in some embodiments wherein the rare earth magnet has a coating, the decrepitation process is carried out at a temperature of at least 50, at least 70 or at least 100° C. and/or a pressure of at least 5, at least 8 or at least 10 bar. In other embodiments, the method further comprises damaging the coating (e.g. by scratching, breaking or puncturing the coating), such that the decrepitation process may be carried out at approximately room temperature and atmospheric pressure. Damage to the coating may also be achieved by the destructive processing method(s) used to break up the assembly, such as by cutting or shredding.

Hydrogen decrepitation of rare earth magnets that have been protected with a coating, such as nickel (Ni), Zinc (Zn), Gold (Au) or aluminium (Al) plating, results in a mixture of rare earth particulate material and particles of coating material. Up to about 10% of the decrepitated material may be coating material. This is a significant problem for the recovery and recycling of rare earth particulate material because the presence of the coating particles can degrade the magnetic properties of a new magnet produced from the decrepitated material.

Thus, in some embodiments, the rare earth magnet has a coating and exposure of the assembly to hydrogen gas to effect hydrogen decrepitation results in production of coating particles in addition to rare earth particulate material.

The method may further comprise the step of separating the coating particles from the rare earth particulate material. Separation of the coating particles from the rare earth particulate material may be carried out by sieving, magnetic separation, electrostatic separation or gas separation, all of which are common techniques in scrap separation and will be known to those skilled in the art.

In a second aspect, the present invention provides a method of separating rare earth particulate material, produced by hydrogen decrepitation of a rare earth magnet, from coating particles, comprising the steps of:

reducing the particle size of the rare earth particulate material to produce a rare earth powder, without substantially changing the particle size of the coating particles; and separating the rare earth powder from the coating particles.

The terms "rare earth particulate material" and "rare earth powder" describe materials resulting from the decrepitation of rare earth magnets. It will therefore be understood that "rare earth" in this context refers not to elemental rare earths, but to the rare-earth containing alloys (e.g. NdFeB, SmCo) from which the original magnet was made. It will also be appreciated that following the decrepitation process, the rare earth material also contains hydrogen.

It is known that rare earth magnets can be re-processed using hydrogen decrepitation. This process has previously only been applied to "clean" uncoated magnets and not to coated magnets where a significant proportion of the content is other materials which contaminate the recovered magnet material and make it unsuitable for recycling to form new sintered magnets. Thus the method of the second aspect of the invention allows rare earth magnet material to be recovered from primary and secondary scrap free from contamination due to coating materials, without the need for chemical processing to separate the magnet material from the coating material.

The decrepitation process changes some of the physical characteristics of the rare earth particulate material, such that it is more friable than the coating particles, i.e. it is very brittle and already has cracking along the grain boundaries of the material contained within each particle. It is this property which allows the rare earth particles to be broken down to a smaller particle size in preference to the coating particles.

The coating particles produced by the decrepitation process may be from 10 µm to 1 cm in diameter, in particular from 0.5 cm to 1 cm in diameter. The rare earth particulate material, prior to being reduced in size, may have a particle size ranging from about 1 µm to about 1 cm in diameter. The coating particle content of the rare earth particulate material may therefore be initially reduced (prior to reducing the size of the rare earth particles) by sieving using a relatively coarse sieve. Thus, in some embodiments, the method further comprises an initial step of sieving the decrepitated material. This separates the larger coating particles from the rare earth particulate material and the smaller coating particles. The sieve may have a mesh size of at least 0.2 cm, at least 0.5 cm, at least 1 cm or at least 1.5 cm.

An initial sieving step (prior to reducing the particle size of the rare earth particulate material) is also advantageous because it helps to reduce the oxygen content of the final rare earth powder. Rare earth magnets are prone to oxidation, and it is desirable to remove surface-oxidised rare earth magnet material because its magnetic properties are generally degraded. The present inventors have found that when the coating breaks away from the surface of the magnet during the decrepitation process, the coating material pulls away some of the surface magnet material which is likely to contain a significant amount of oxidised material. The initial sieving step to remove relatively large coating particles therefore also allows oxidised magnet material associated with the coating particles to be separated from the non-oxidised magnet material.

The reduction in the particle size of the rare earth material will depend on the method used to break down the particles and on the length of time the method is carried out. The particle size of the rare earth powder, after being reduced in size, may be less than 200 µm, less than 150 µm, less than 100 µm, less than 75 µm, less than 50 µm or less than 45 µm in diameter.

The rare earth particulate material may be derived from primary scrap or from secondary scrap. As used herein, "primary scrap" refers to scrap magnet material, for example scrap produced by factories which make or shape rare earth magnets. "Secondary scrap" refers to scrap assemblies comprising rare earth magnets, such as computer hard drives.

In some embodiments, the rare earth particulate material is demagnetised prior to separation of the rare earth particulate material from the coating particles. In some embodiments, demagnetisation allows the rare earth particulate material to be separated more easily from the coating particles. NdFeB rare earth material is demagnetised during the decrepitation process such that an additional demagnetisation step is not required. However, in embodiments wherein the original magnet was made of SmCo, the method further comprises demagnetisation of the rare earth particulate material.

In some embodiments, reducing the particle size of the rare earth particulate material to produce a rare earth powder is carried out using milling (such as ball milling, grinding or gas jet milling) mechanical agitation (such as shaking, vibration or tumbling), centrifugal forces or ultrasound. It will be understood that the process of reducing the particle size will be carried out with sufficient energy, and for a sufficient duration of time, in order to reduce the particle size of at least 80%, at least 90%, at least 95%, at least 98% or substantially all of the rare earth particles.

Separation of the rare earth powder from the coating particles may be carried out by any suitable method, such as by sieving, gas separation, electrostatic separation or magnetic separation.

In some embodiments, the step of separating the rare earth powder from the particulate coating material comprises passing the rare earth powder through a screen or sieve. The screen or sieve may have a mesh size which permits only the rare earth powder to pass through while retaining the particulate coating material on the screen/sieve. In some embodiments, the rare earth powder is passed through a series of screens, wherein each subsequent screen has a smaller mesh size, i.e. it permits a smaller particle size to pass through. Some particles of coating material may pass through some of the screens but generally the coating particles are too large to pass through all of the screens, thereby enabling separation of the rare earth powder from the coating material. The particulate coating material retained on one or more of the screens may be disposed of or recycled.

The process of reducing the particle size of the rare earth particulate material to produce a rare earth powder and the separation of the rare earth powder from the coating particles may be carried out at simultaneously or consecutively. In some embodiments, the size of the rare earth particles is reduced at the same time as separating the resulting rare earth powder from the coating particles. In some embodiments, the particle size is reduced while the rare earth material is passed through a screen or series of screens. For example, a particle size reducer (e.g. ball bearings or brushes) may be located on a screen, or on one or more of a series of screens, such that the rare earth particulate material can be mechanically agitated and broken down during the screening process. Ball bearings can be of any suitable diameter that is larger than the mesh size of the screen, for example at least 2 mm in diameter or at least 5 mm diameter. Different ball bearing diameters can be used on screens of different mesh sizes.

When the screening is carried out using a series of screens or sieves, it is preferable that the sieves are close fitting when stacked together, such that the bottom of one sieve fits closely with the top of the sieve below. Ideally the stack of sieves would also have a cover or a lid to reduce the loss of fine powder from the process.

The method of the second aspect of the invention, or a part of said method, may be carried out after or at the same time as the hydrogen decrepitation process (i.e. the exposure of the rare earth magnet or assembly to hydrogen gas). Conveniently, the hydrogen decrepitation and separation process may be carried out using the same apparatus. For example a sieve or a series of sieves may be positioned in or below the hydrogen decrepitation vessel, so that decrepitated material falls directly onto the sieve. The decrepitation and separation processes may therefore be continuous or consecutive. Alternatively, the material produced by hydrogen decrepitation may be transferred to a separate screening apparatus. In some embodiments, the material is transferred under an inert atmosphere. This protects the rare earth particulate material from oxidation, which is important if the material is to be used to make further magnets.

The particles which result from the decrepitation process are a hydrogenated form of the rare earth alloy. In some embodiments, the method further comprises degassing in order to break down the hydrogenated alloy to remove the $H_2$ from the particulate material. In some embodiments, degassing is carried out by heating the particulate material. In a series of embodiments, degassing is carried out at a temperature of no more than 1500° C., no more than 1000° C. or no more than 800° C. In another series of embodiments, degassing is carried out at a temperature of no less than 400° C., no less than 500° C., no less than 600° C. or no less than 700° C. In a particular embodiment, degassing is carried out at a temperature of 750° C. In another series of embodiments, degassing is carried out at a pressure of no more than 1 Bar, no more than 0.5 Bar, no more than 0.1 Bar, no more than 0.05 Bar or no more than 0.01 Bar. Degassing may be carried out immediately after separation of the rare earth powder from the particulate coating material, or it may be carried out at a later time or date. In some embodiments, degassing is carried out after separation of the rare earth powder from the coating particles.

The decrepitated rare earth particles, in particular NdFeB particles, are susceptible to oxidation and react readily with oxygen in air. Surface oxidation can degrade the properties of the new magnet that is produced when the particulate magnet material is recycled into a new magnet and magnetised to firm a permanent magnet. This is particularly important as the particulate rare earth material has a large surface area which will oxidise if the screening is carried out in air. Therefore, in some embodiments, the process of reducing the particle size of the rare earth particulate material and/or separation of the rare earth powder from the particulate coating material is carried out in the absence of oxygen. In some embodiments, one or both of these steps are carried out in an inert atmosphere of argon or nitrogen.

The method according to the second aspect of the invention can be carried out as a batch process or as a continuous process.

According to a third aspect of the present invention there is provided apparatus for separating rare earth particulate material from an assembly comprising a rare earth magnet, the apparatus comprising a reaction vessel having an opening which can be closed to form a gas-tight seal, a separator for separating the rare earth particulate material from the assembly, and a collector for collecting the rare earth particulate material, wherein the reaction vessel is connected to a vacuum pump and a gas control system, and wherein the gas control system controls the supply of hydrogen gas to the reaction vessel.

In an embodiment, the apparatus further comprises a device for opening, distorting or destructively processing the assemblies prior to decrepitation. In a particular embodiment, the apparatus comprises a shredder for shredding assemblies prior to the assemblies being loaded into the reaction vessel. In another embodiment the apparatus comprises a cropper for cropping or cutting open the assembly prior to decrepitation.

The scrap assemblies may be manually loaded into the reaction vessel, or they may be loaded from a hopper. In an embodiment, the assemblies are transported from the destructive processing device to the reaction vessel by a conveyor.

In a further embodiment, the apparatus comprises a heater for heating the reaction vessel during the decrepitation and/or degassing process. In another embodiment, a temperature control system is provided to monitor and control the temperature inside the sealed reaction vessel when the apparatus is in use, i.e. during the decrepitation process. The temperature may be manually controlled, or it may be controlled by a preset programme.

The gas control system may monitor and control the pressure inside the sealed reaction vessel when it is in use. The pressure may be manually controlled, or it may be controlled by a preset programme.

In an embodiment, the separator comprises a porous container which is positioned inside the reaction vessel. The rare earth particulate material produced by the decrepitation process may pass through the pores of the bottom and sides of the container and into the reaction vessel, while the remaining assembly components are retained within the container, thereby separating the particulate material from the assembly. The porous container may be removable, or it may be permanently fixed within the reaction vessel. In a particular embodiment, the separator further comprises a vibrator which agitates the porous container to facilitate separation of the loose particles from the assembly. In a further embodiment, the separator comprises a rotatable porous container. After decrepitation the container is rotated with the assemblies inside. The tumbling action causes the rare earth particulate material to fall out of the assembly components and through the holes/pores in the wall of the rotatable container to be collected in a suitable container below. The pores may be of any suitable size which allows the particulate material to pass through them but which retains the assemblies inside the container. The pores may conveniently be 2-3 mm in diameter. The rotatable container may be incorporated into or form part of the decrepitation vessel so that the mechanical agitation can take place during or after decrepitation. Alternatively, the rotatable container may be separate to the reaction vessel. In this embodiment the decrepitated assemblies are removed from the reaction vessel after decrepitation is complete and are then placed in the rotatable container for separation of the particles of rare earth material.

The collector may be constituted by the reaction vessel or a part thereof. For example, the base of the reaction vessel may constitute the collector. Alternatively, the collector may comprise a separate collection vessel that is connected to the reaction vessel. The collection vessel may be isolated from the reaction vessel by a valve which can be opened to allow the particles to pass from the reaction vessel into the collection vessel when required. In an embodiment, the collection vessel is situated underneath the reaction vessel so that the particles fall under gravity into the collection vessel when the valve is opened.

In some embodiments, the apparatus further comprises at least one sieve. The sieve may have a mesh size of no more than 2000 µm, no more than 850 µm, no more than 500 µm, no more than 250 µm, no more than 100 µm or no more than 50 µm. In further embodiments, the apparatus comprises a series of sieves of decreasing mesh size. The mesh sizes may range from 40 µm to 2000 µm. In preferred embodiments, the series of sieves comprises a sieve having a mesh size of no more than 100 µm, or no more than 50 µm. It has generally been found that once the powder has been passed through a sieve having a mesh size of 100 µm or less, the powder contains very little coating material. The sieves may be stacked on top of one another to facilitate separation of the particles.

In some embodiments, the apparatus further comprises a particle size reducer for reducing the particle size of the rare earth particulate material without substantially changing the particle size of the coating particles. The particle size reducer may comprise a grinder, a vibration device (e.g. a vibrating platform), a plurality of ball bearings, a jet mill (a cyclone of inert gas such as nitrogen which spins the material around inside a vessel and collides the particles together in order to break them down), a centrifuge, an ultrasound device, or a combination thereof. The particle size reducer may be associated with the sieve (or series of sieves). For example, a plurality of ball bearings may be positioned on the surface of a sieve (or on the surfaces of each of a series of sieves) and shaken or vibrated in order to break down the rare earth particles. Alternatively, the particle size reducer may be separate from the sieve(s).

The invention will now be described by way of example with reference to the accompanying figures in which:

FIG. 1 shows apparatus according to an embodiment of the present invention, which is used to recover rare earth magnets from assemblies using hydrogen decrepitation.

Figure 1:
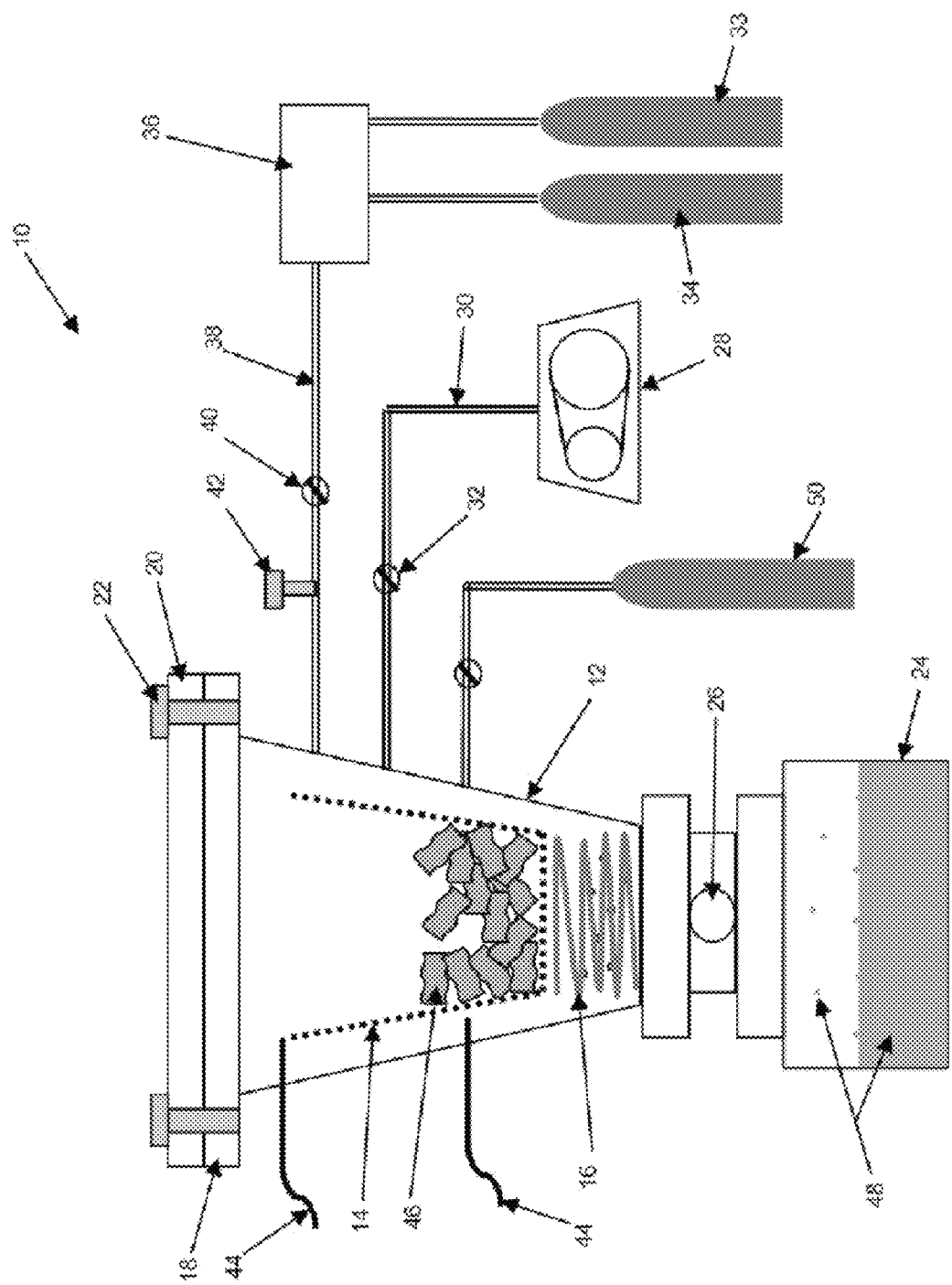
FIG. 1 is a schematic diagram of apparatus according to an embodiment of the present invention.

The apparatus 10 comprises a reaction vessel 12 which houses a porous container 14 positioned above a heater 16. The reaction vessel 12 is open at its top end 18 so that scrap assemblies can be loaded into the vessel 12. The reaction vessel 12 can be closed by a lid 20 which is secured by a fastener 22, to give a gas tight seal between the vessel top 18 and the lid 20.

The reaction vessel 12 is situated above a collection vessel 24 which is used to collect the rare earth particulate material produced by the decrepitation process. A valve 26 is used to control the flow of particulate material from the reaction vessel 12 to the collection vessel 24.

The reaction vessel 12 is connected to a rotary vacuum pump 28 via tubing 30. The flow of gas through the tubing 30 is controlled by a valve 32.

The reaction vessel 12 is also connected to gas supply sources 33, 34 through a gas control system 36 via a gas line 38. The gas control system 36 monitors the pressure in the reaction vessel 12 and maintains it at the desired level. A gas line valve 40 and a pressure transducer 42 are situated on the gas line 38 to allow monitoring and control of the gas flow to the reaction vessel 12.

Thermocouples 44 are provided to monitor the temperature inside the reaction vessel 12.

Figure 2B:
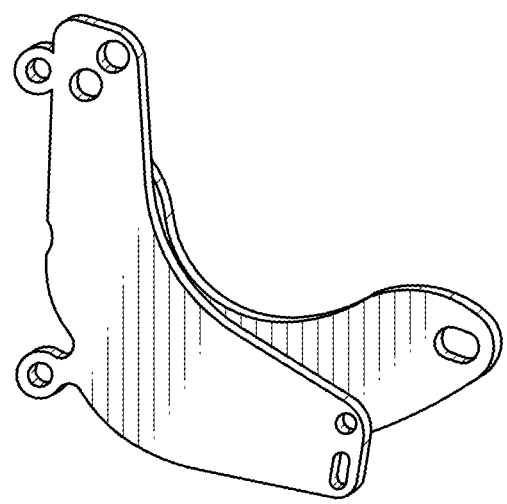
FIG. 2b shows a voice coil assembly manually removed from a computer hard drive, prior to being processed by the method of the present invention.
Figure 2A:
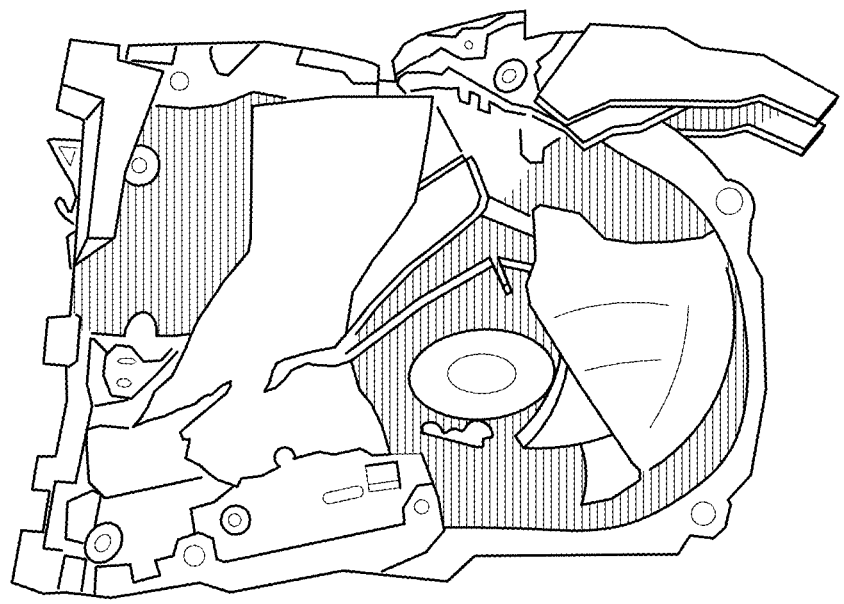
FIG. 2a shows a roughly shredded computer hard drive prior to being processed by the method of the present invention.
Figure 2C:
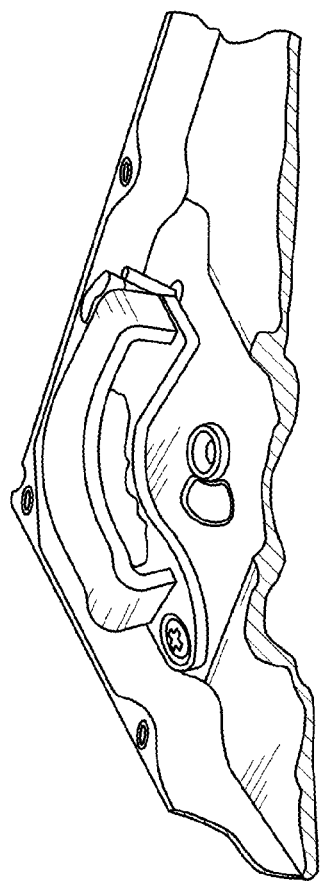
FIG. 2c shows a hard drive assembly that has been cut open and then subjected to hydrogen decrepitation to remove the rare earth magnets, in accordance with an embodiment of the present invention.

In use, scrap assemblies containing rare earth magnets are comminuted by a shredder or cut open by a cropper (not shown) and manually transferred into the porous container 14. In other embodiments (not shown), the shredded or cropped assemblies 46 are passed along a conveyor to the porous container 14. Depending on the nature and size of the assembly the whole assembly may be subject to hydrogen decrepitation or, alternatively, the assembly may be partially dismantled for processing only a part thereof. For example, the assemblies 46 comprise shredded or cropped computer hard drives and voice coil assemblies, like the ones shown in FIGS. 2a, 2 and 2c. The lid 20 of the reaction vessel 12 is closed and secured by the fastener 22 so that the reaction vessel 12 is gas tight. The reaction vessel 12 is then evacuated through the tubing 30 (through open valve 32) using the rotary vacuum pump 28 to a pressure of $10^{-2}$ mbar, as indicated by the pressure transducer 42. The valve 32 is closed and the reaction vessel 12 is backfilled with argon from gas supply source 33 to a pressure of 1 bar, through gas control system 36 and open valve 40 in gas line 36. The gas line valve 40 is then closed and the valve 32 is opened to allow the vacuum pump 28 to evacuate the reaction vessel 12 to a pressure of $10^{-2}$ mbar. Valve 32 is then closed and the reaction vessel 12 is backfilled with hydrogen from supply source 34 to a pressure of between 1 and 7 bars. The pressure in the reaction vessel is maintained by the gas control system 36.

The decrepitation process starts once the hydrogen enters the reaction vessel 12 and accesses the assemblies 46, turning the rare earth magnets into a particulate material 48. The assemblies are exposed to the hydrogen gas for 2 to 5 hours.

The porous container 14 is agitated by a vibrator (not shown) during or after the decrepitation process to move the decrepitated magnet particles from the scrap assembly material and through the holes of the porous container 14 so that they collect in the bottom of the reaction vessel 12. Valve 26 is opened to allow the particles to fall from the reaction vessel 12 into the collection vessel 24.

If degassing of the particles is required, the valve 26 is left closed and vibration is not applied. The decrepitated scrap assembly material (including the rare earth particulate material) is heated by the heater 16 to a temperature of 750° C., which is monitored using thermocouples 44 and controlled using a temperature controller (not shown). Degassing is carried out at a pressure of below 1 Bar, ideally under a vacuum of $10^{-2}$ Bar The hydrogen removed from the rare earth particulate material can either be pumped into the atmosphere or it can be captured by a metal hydride store 50.

The processing vessel can decrepitate a scrap charge of approximately 300 to 400 shredded/chopped hard disk drives or 1000 to 2000 voice coil assemblies. Processing 400 shredded hard drives results in the recovery of approximately 8 kg of NdFeB particulate material. Processing of 2000 voice coil assemblies results in the recovery of approximately 40 kg of NdFeB particulate material.

Figure 3:
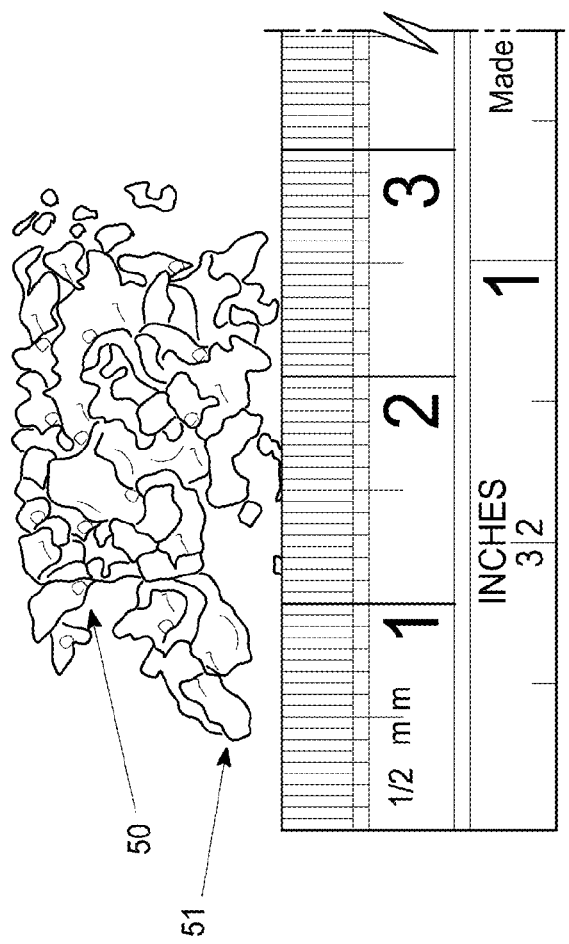
FIG. 3 shows rare earth particulate material obtained by the method of the present invention.

FIG. 3 shows a sample of rare earth particulate material produced by the method of the present invention. The sample contains particles 50 with areas of nickel plating 51 present.

Rare earth particulate material recovered from assemblies by the methods of the invention may be further processed, for example by jet milling, and used in a variety of applications. For example, the material is suitable for use in the following processes:

1. The recycled particles can be put into a refining process, such as fused salt electrolysis, to separate the rare earths from the other components such as iron and boron.
2. The particles can be jet milled (optional), pressed and then sintered into new magnets.
3. The particles can be re-melted and melt spun to produce material for bonded magnets.
4. The particles may be heated in hydrogen and then degassed to produce fine grained material for bonded magnets by mixing with an appropriate bonding agent.
5. Degassed particles may be directly mixed with a bonding agent such as epoxy and then pressed to make cheap bonded magnets.

If the magnets of the assemblies have a relatively low rare earth content to start with (e.g. near stoichiometric $Nd_2Fe_{14}B$), it may be necessary to add extra rare earth to the decrepitated particulate material prior to forming new magnets in order to compensate for rare earth 'lost' to oxidation. During recycling the oxygen content of the rare earth material tends to rise and rare earth oxides form. A certain amount of clean, metallic rare earth rich phase is essential for sintering to full density, giving better magnetic properties and corrosion resistance. The increased oxygen content can make the material more difficult to sinter into new magnets and give a lower density product, hence the addition of small amounts of Nd or $NdH_2$ to the particulate material. Typically an addition of 1-2 at % has been shown to give the best magnetic properties. If the Nd content of the magnets is sufficiently high to begin with then extra Nd may not be required as a smaller overall percentage of the neodymium will oxidise during processing.

Table 1 shows the properties of recycled magnets made from rare earth particulate material produced by the process of the invention, compared to an intact rare earth NdFeB magnet 'as received', i.e. prior to decrepitation. The 'as received' magnet had a composition of $Nd_{13.4}Dy_{0.8}Al_{0.7}Nb_{0.3}Fe_{78.5}B_{6.3}$ (at % from ICP). Recycled sintered magnets were made using decrepitated particulate material with no Nd addition and with additions of 1%, 2% and 4% Nd.

TABLE 1

|  | Density (gcm$^{-3}$) | % porosity | Br (mT) | Hcj (kAm$^{-1}$) | Bhmax (kJm$^{-3}$) |
| --- | --- | --- | --- | --- | --- |
| Intact magnet | 7.58 | 0 | 1380 | 860 | 340 |
| No Nd addition | 6.8 | 10.3 | 1080 | 460 | 195 |
| 1at % Nd | 7.29 | 3.8 | 1060 | 890 | 200 |
| 2at % Nd | 7.48 | 1.3 | 1160 | 925 | 250 |
| 4at % Nd | 7.49 | 1.2 | 930 | 1025 | 155 |

It was observed that the recycled magnet made with an addition of 2% Nd had the best properties including highest coercivity (Hcj) and highest remanence (Br).

Figures 4A, 4B:
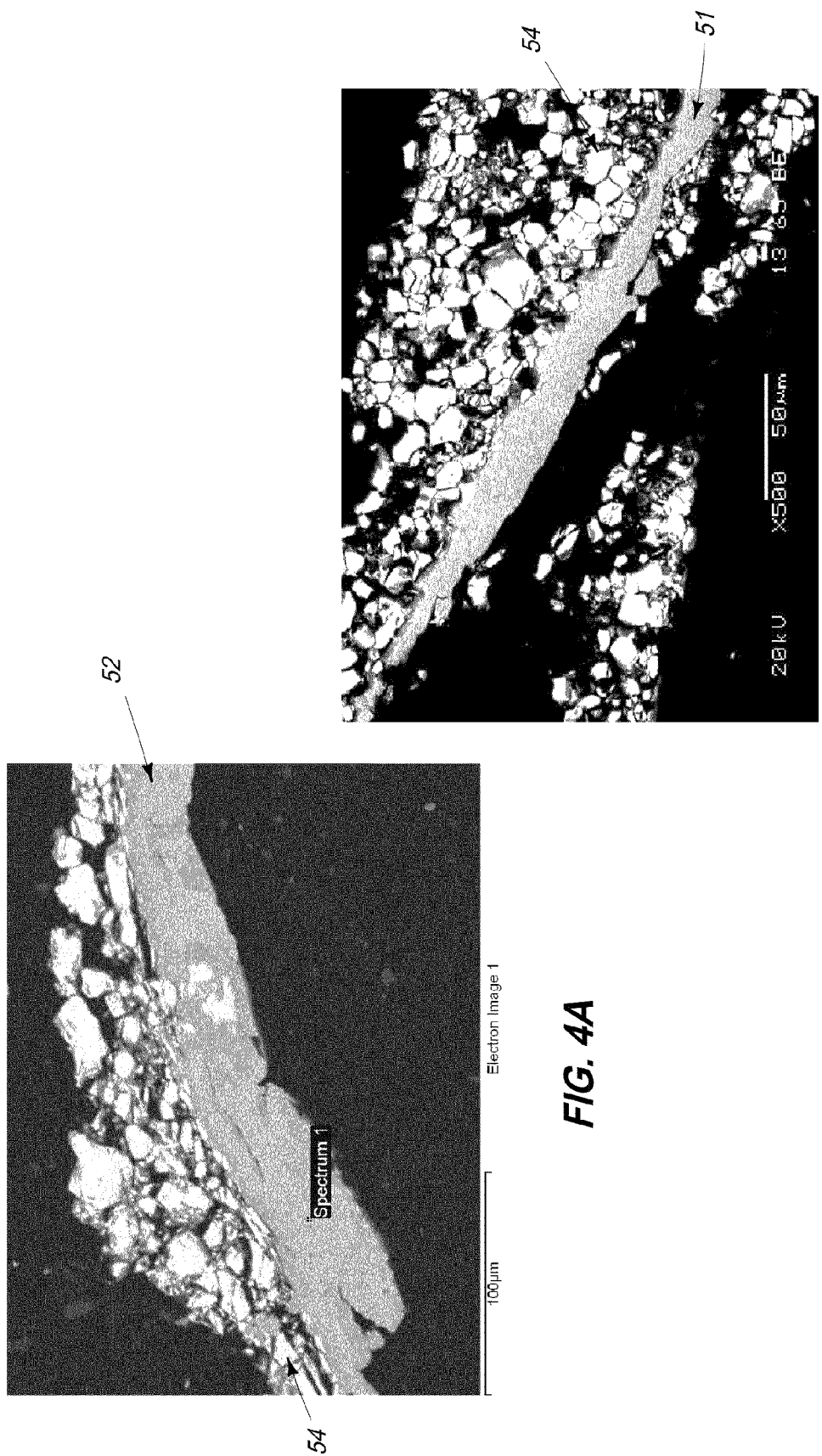
FIG. 4a is an electron micrograph of a flake of a nickel-copper-nickel coating that has been separated from a NdFeB magnet by decrepitation.
FIG. 4b is an electron micrograph of a flake of a nickel coating that has been separated from a NdFeB magnet by decrepitation.

FIGS. 4a and 4b show rare earth particulate material 54 resulting from hydrogen decrepitation of rare earth magnets, which contains flakes of Ni—Cu—Ni coating 52 or Ni coating 51.

Figure 5:
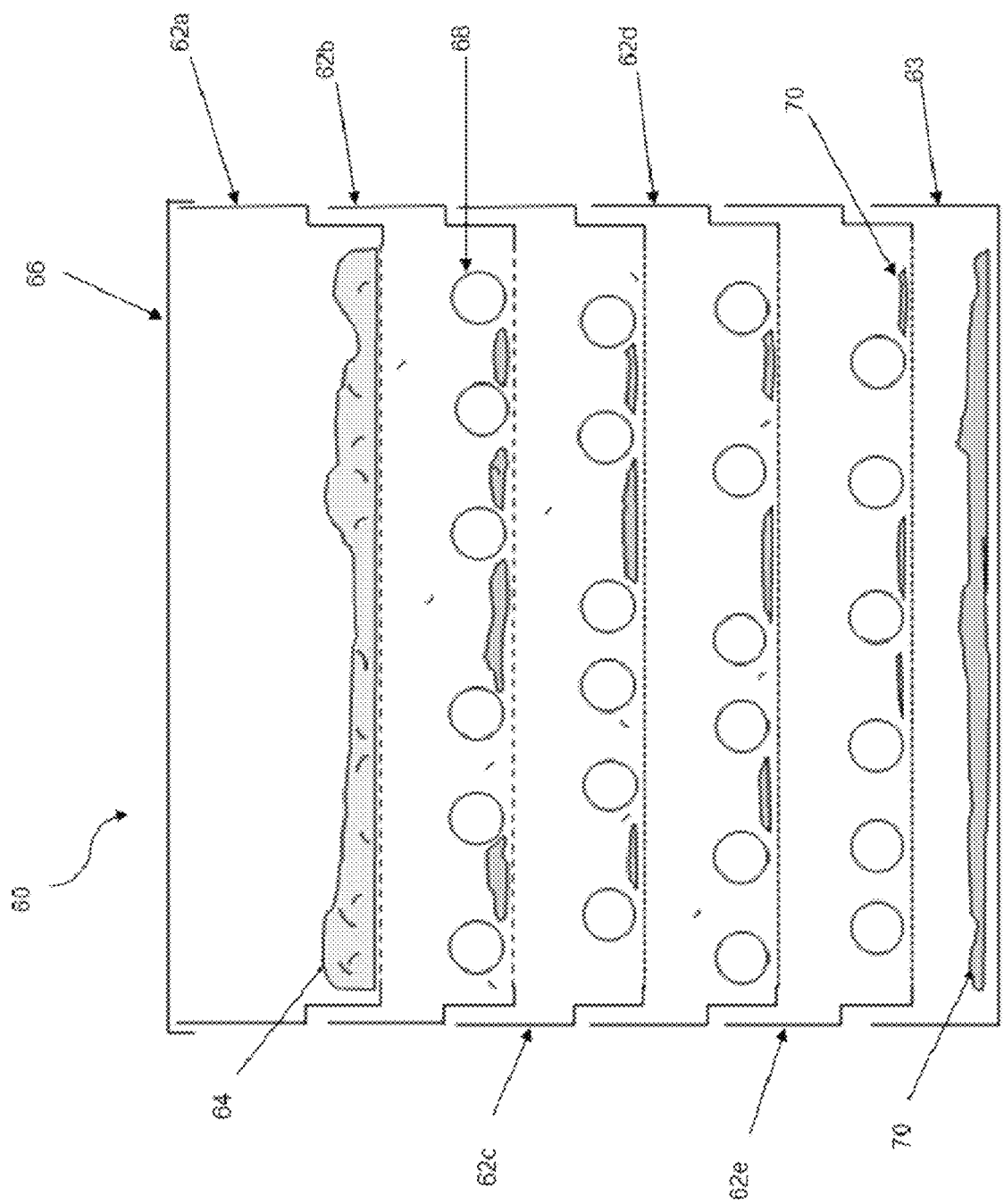
FIG. 5 is a schematic diagram of apparatus suitable for carrying out an embodiment of the method of the second aspect of the present invention.

FIG. 5 shows a schematic diagram of a stack of screening sieves which were used for separating rare earth particulate material from coating particles in accordance with an embodiment of the method of the second aspect of the present invention.

Decrepitated NdFeB powder produced from the decrepitation of hard drive units in accordance with the method of GB1020383.4 was collected from the discharge valve at the bottom of the decrepitation vessel. The decrepitated powder comprised a mixture of NdFeB particles and 10% by weight Ni particles, the Ni particles being the debris left from the Ni coating on the NdFeB magnets.

Apparatus 60 comprising stack of screening sieves 62a-e was assembled over a collection tray 63 as shown in FIG. 5. The size of the mesh of the sieves decreased from the top to the bottom of the stack. Screens having the following mesh numbers were used: Sieve 62a: mesh number 10 (2000 μm); sieve 62b: mesh number 18 (1000 μm); sieve 62c: mesh number 60 (250 μm); sieve 62d: mesh number 104 (105 μm); and sieve 62e: mesh number 325 (46 μm). It will be appreciated by the skilled person that fewer or more sieves, or different mesh sizes, can be used.

The decrepitated mixture 64 comprising NdFeB rare earth particles and Ni coating particles was placed on the uppermost sieve 62a and a lid 66 was placed over the top. A sieve shaker (not shown) was used to shake the sieves to encourage the particles to pass through the mesh. A particle size reducer in the form of 5 mm diameter ball bearings 68 was provided on each of the subsequent sieve screens to fragment the friable NdFeB particles.

The Ni coating particles were unable to pass through the 105 μm mesh screen of sieve 62d, and coating particles were retained by all of the sieves 62a-62d. The NdFeB rare earth particles were broken down by the shaking action of the sieve shaker and by the ball bearings 68, producing a fine powder 70. This fine powder 70 passed completely through the 105 μm screen 62d. The majority of the powder 70 also passed through the 46 μm screen 62e into the collection tray 63.

The Ni content of the NdFeB rare earth powder 70 collected from the collection tray 63 and the 46 μm screen 62e was found by chemical analysis to be less than 0.03 wt %. The Ni coating particles captured by the 2000 μm sieve 62a were found to be associated with oxidised NdFeB particles, thereby reducing the oxygen content of the resulting powder 70.

Due to its low Ni content, the NdFeB fine rare earth powder 70 produced is suitable for compacting and sintering to form new sintered magnets or for use in bonded magnets.

Figure 6:
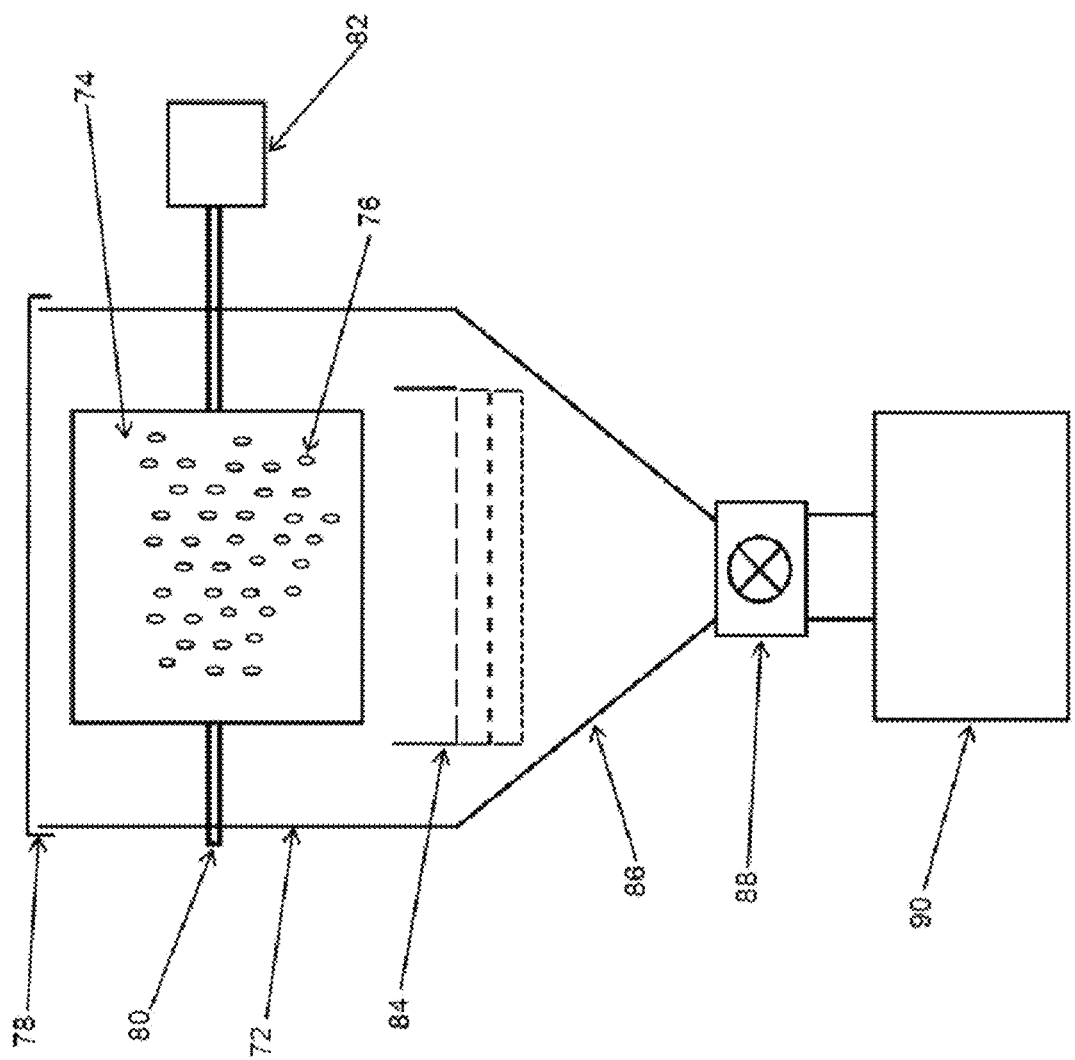
FIG. 6 is a schematic of apparatus suitable for carrying out hydrogen decrepitation of magnets and/or assemblies and separation of coating particles from the rare earth particulate material resulting from the decrepitation process.

FIG. 6 is a schematic showing a modified apparatus which can be used for both hydrogen decrepitation of magnets/assemblies and separation of coating particles from the rare earth particulate material resulting from the decrepitation process. The decrepitation vessel 72 contains a rotating drum 74 with perforations 76 into which assemblies comprising coated rare earth magnets are loaded. The vessel is closed with a lid 78 and then filled with hydrogen gas (or a mixture of gases comprising hydrogen) through gas lines (not shown) to start the decrepitation process. As the decrepitation process progresses the drum 74, which is mounted on a shaft 80, is rotated by a motor 82. The rotation of the drum 74 causes the rare earth particulate material magnet and coating particles to fall through the perforations 76 onto a screen 84. The screen 84 comprises a series of sieves of decreasing size and a particle size reducer for reducing the particle size of the rare earth particulate material via mechanical agitation, the particle size reducer including a vibrator and ball bearings on the surface of one or more of the sieves. The combination of vibration and the movement of the ball bearings breaks down the rare earth particulate material, allowing the particles to pass through the sieves into a tapered bottom portion 86 of vessel 72. The resulting rare earth powder is released from the tapered bottom portion 86 of vessel 72 by a valve 88 into a storage vessel 90.

The invention claimed is:

1. A method for recovering rare earth particulate material from an assembly comprising a rare earth magnet having a coating, the method comprising the steps of:
    exposing the assembly to hydrogen gas to effect hydrogen decrepitation of the rare earth magnet whereby a rare earth particulate material and coating particles are produced,
    separating the rare earth particulate material and the coating particles from the rest of the assembly,
    reducing the particle size of the rare earth particulate material to produce a rare earth powder without substantially changing the particle size of the coating particles, and
    separating the rare earth powder from the coating particles by passing the rare earth powder through at least one screen.

2. The method according to claim 1, wherein the rare earth particulate material and coating particles resulting from the decrepitation process are separated from the remaining assembly components by shaking, vibration, sieving, tumbling or using centrifugal forces.

3. The method of claim 1, wherein the rare earth magnet is $Sm_2Co_{17}$, and the decrepitation process is carried out at a temperature of at least 70° C. and/or a pressure of at least 7 bar.

4. The method of claim 1, wherein the method is for recovering NdFeB or $SmCo_5$ particulate material from an assembly comprising an NdFeB and/or a $SmCo_5$ magnet and a $Sm_2Co_{17}$ magnet, the method comprising the steps of:
    exposing the assembly to hydrogen gas at a temperature and pressure sufficient to effect hydrogen decrepitation of the NdFeB and/or the $SmCo_5$ magnet only, whereby NdFeB and/or $SmCo_5$ particulate material is produced, and
    separating the NdFeB and/or $SmCo_5$ particulate material from the rest of the assembly.

5. The method of claim 1, wherein the decrepitation process is carried out at a temperature of at least 100° C. and/or a pressure of at least 5 bar.

6. The method of claim 1, further comprising damaging the coating prior to the decrepitation process.

7. The method of claim 1, wherein the particle size of the rare earth particulate material is reduced by milling, mechanical agitation, air pressure, centrifugal forces or ultrasound.

* * * * *